E. B. BIRCH.
SHOT FIRING ATTACHMENT FOR ELECTRIC BATTERIES.
APPLICATION FILED NOV. 13, 1918.
1,363,224. Patented Dec. 28, 1920.
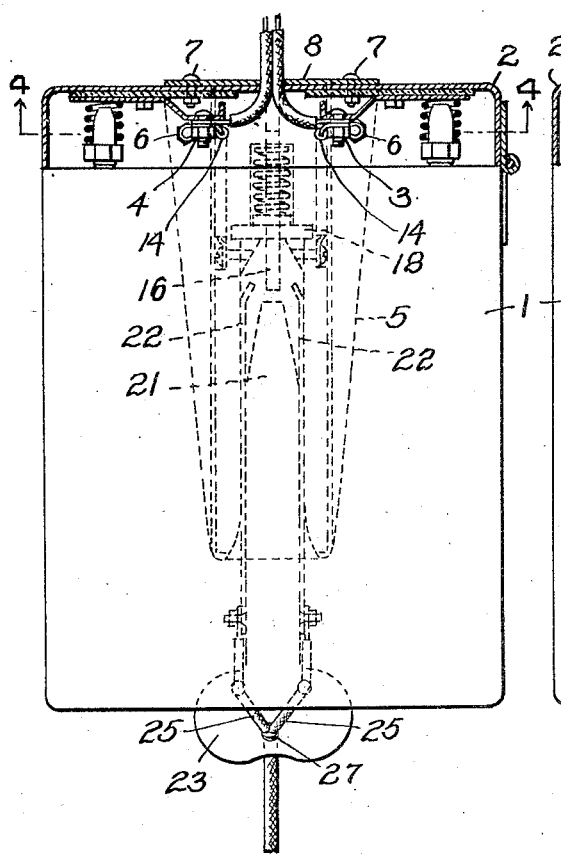
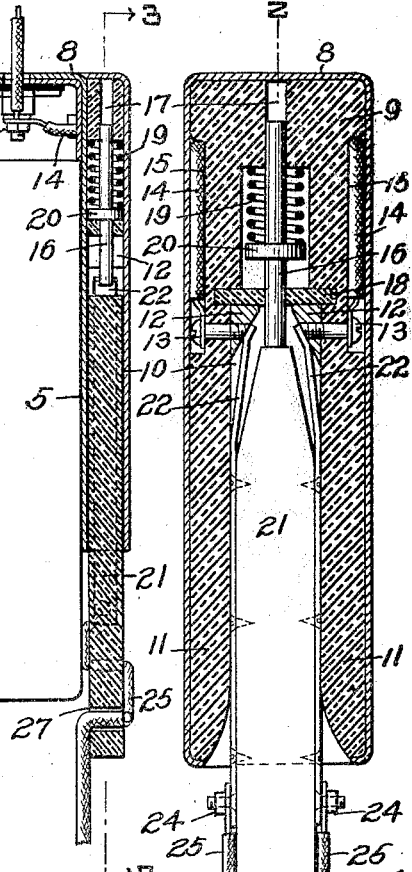
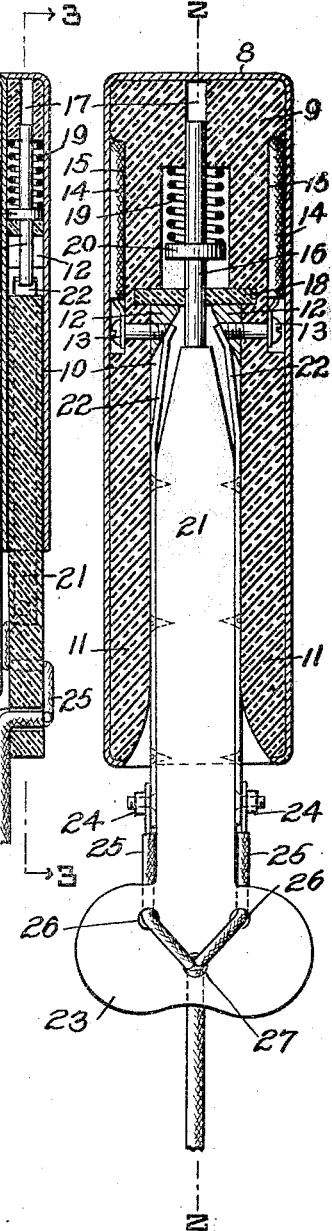
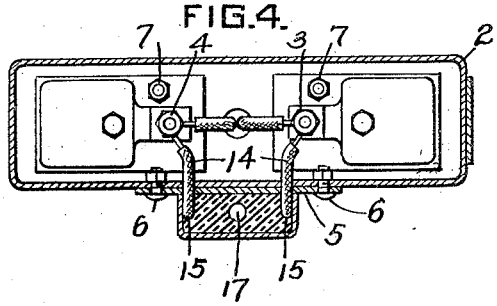

UNITED STATES PATENT OFFICE.

EZEKIEL BOYD BIRCH, OF CRAFTON, PENNSYLVANIA, ASSIGNOR TO MINE SAFETY APPLIANCES COMPANY, OF PITTSBURGH, PENNSYLVANIA, A CORPORATION OF PENNSYLVANIA.

SHOT-FIRING ATTACHMENT FOR ELECTRIC BATTERIES.

1,363,224.  Specification of Letters Patent.  Patented Dec. 28, 1920.

Application filed November 13, 1918. Serial No. 262,306.

*To all whom it may concern:*

Be it known that I, EZEKIEL BOYD BIRCH, a resident of Crafton, in the county of Allegheny and State of Pennsylvania, have invented a new and useful Improvement in Shot-Firing Attachments for Electric Batteries, of which the following is a specification.

This invention relates to shot firing attachment for electric batteries, for use for firing shots in mines to bring down the coal, ore, or rock, for miscellaneous blasting purposes, and like uses.

The object of the invention is to provide an attachment for electric batteries which is of simple and durable construction, by means of which the shot can be readily set off, which automatically breaks the circuit and therefore avoids danger should the connecting wires be attached to another explosive charge, and which is convenient and safe to use.

The improvement is designed for attachment to any form or character of electric battery but in the accompanying drawings it is illustrated as attached to a well known type of Edison battery used by coal miners for energizing their cap lamps, but it will be understood that this is merely for purposes of illustration.

In the accompanying drawings Figure 1 is a side elevation of an Edison miners' battery, the cover being in longitudinal sections and indicating the attachment thereon; Fig. 2 is a vertical sectional view through the attachment on the line 2—2, Fig. 3; Fig. 3 is a vertical section on the line 3—3, Fig. 2; and Fig. 4 is a horizontal section on the line 4—4, Fig. 1.

In the drawings 1 represents the body of an Edison battery such as used by coal miners for energizing their miners' lamps, and 2 represents the cover thereof. These parts are merely to illustrate one type of electric battery to which the invention can be applied. 3 and 4 indicate the binding screws forming the poles of the battery, which in this instance are carried by the cover 2, and serve as the means for connecting to the battery the conductors leading to the miner's lamp.

The attachment forming the subject of this invention, comprises a suitable casing formed by a base member or plate 5 to be attached to the battery and which in the form of battery illustrated is attached to the cover thereof, such as by means of screws, small bolts, rivets, or the like 6 going through the edge of the base plate and the wall of the cover. Preferably the upper end of this base plate is turned at an angle and lies on top of the cover and is further attached to the cover, such as by means of screws, small bolts, rivets and the like 7. Suitably attached to this plate is a cover or casing proper 8, which, in the form illustrated, is closed at the top and sides, but open at the bottom and serves to house and inclose the operative parts.

Within this casing is a body 9 of any suitable insulating material, such as fiber, but preferably of some molded composition, such as bakelite, or the well known cold molded asbestos compositions. This insulating body is provided with a passage or slot 10 extending from its lower end upwardly, forming two side legs 11. Secured to each of these legs, somewhat below their upper ends and projecting into the passage or slot 10 are a pair of terminals 12, which preferably are formed with inclined faces, as shown in Fig. 3. These terminals are connected to screws 13 having their heads seated in recesses in the outer faces of the legs 11, and are adapted to be connected by wires 14, which extend up through grooves 15 formed in the outer faces of the legs, and thence through the walls of the cover and are attached respectively to the binding screws 3 and 4 which form the poles of the battery.

An ejecting or retracting member 16 is mounted to reciprocate vertically between the upper portions of the legs 11, being guided at its upper end in a hole 17 in the upper portion of the insulating body 9, and near its lower end in a bridge piece 18, of the insulating material extending between the legs. A compression spring 19 surrounds this ejector, and is interposed between the upper end of the passage or slot 10 and a suitable abutment, such as washer 20 secured to the ejector.

The circuit closing member is in the form of a plunger 21 formed of insulating material and arranged to project into the slot or passage 10, through the open lower end of the casing. This plunger carries a pair of contact members 22 in the form of spring plates secured to the edges of the plunger and having their upper ends turned slightly inwardly and arranged when the plunger is pushed upwardly in the passage, to contact with the terminals 12 and thus close the circuit. These contact members are narrower than the thickness of plunger 21 so as not to make contact with the metallic walls of the casing, and they are of sufficient stiffness to insure good contact with the terminals 12, and also to serve, when pressure on the plunger is released, to slide down the inclined faces of the terminals 12 and therefore automatically break contact therewith. The upper end of the plunger is arranged to bear against the retractor 16, which is of such length that when fully projected it positively insures breaking contact between the terminals 12 and contact members 22. The upper end of said plunger is cut away on both sides to allow the springs 22 to move inwardly when they contact with the terminals 12. Normally the shot is fired as soon as the springs contact with the terminals 12, but should the shot fail to explode, the further pushing inwardly of the plunger causes the ends of the springs to be forced inwardly until they contact with the metallic retractor 16, thus short circuiting the battery, and preventing ignition of any gases which may accidentally be in the hole in which the explosive charge is placed.

The lower end of plunger 21 is provided with an enlargement 23 forming a handle for operating the plunger. The lower ends of the contacting member 22 are connected to binding screws 24 which are connected to the circuit wires 25 which pass through holes 26 on the handle and thence through another hole 27, and will be connected to the cartridge or other explosive body, forming the shot. In this way a good strain relief is formed.

In the use of the device the plunger 21 is normally out of the casing, and the ejector 16 is fully projected. When it is desired to fire the shot the circuit wires 26 are connected to the cartridge or explosive body, and then the operator inserts the plunger through the open end of the casing and forces the same upwardly in the slot or passage 10. As said plunger is pushed inwardly its upper end comes into contact with the ejector 16, and in the further inward movement of the plunger said ejector is pushed upwardly, compressing the spring 19, and then contact plates 22 come into contact with the inclined faces of the terminals 12, thus closing the circuit from the battery and exploding the shot. As soon as the pressure on the plunger is released said plunger is forced down and entirely ejected from the casing by the combined action of the spring contacts 22 bearing against the inclined faces of terminals 12, and that of the ejector 16 which is moved downwardly by the compression spring 19. As it takes considerable pressure to force the plunger inwardly against the resistance of spring 19 the operator naturally releases this pressure as soon as the shot is fired, whereupon the circuit is automatically broken as described. Consequently there can be no danger of an unintended explosion of another shot in case another workman should connect the free ends of the circuit wires to another explosive charge.

The device described is of simple construction, can be readily attached to any form of electric battery, without alteration of the battery itself, is of durable construction, is reliable and entirely safe to use, and conforms to the mining laws and regulations of the several States.

Various changes can obviously be made in the shape, dimensions and arrangements of the parts.

I claim:

1. A shot firing attachment for electric batteries, comprising a casing arranged to be attached to the battery, an insulating body in said casing provided with a slot or passage, a pair of terminals mounted on said body and projecting into said slot or passage and connected respectively to the poles of the battery, a plunger arranged to enter said passage and carrying a pair of contact members arranged to make contact with said terminals and having circuit wires connected thereto, and a spring-pressed ejector arranged to be engaged by said plunger when it is inserted in said slot and arranged to automatically retract said plunger when the pressure thereon is released.

2. A shot firing attachment for electric batteries, comprising a casing arranged to be attached to the battery, an insulating body in said casing provided with a slot or passage, a pair of terminals mounted on said body and projecting into said slot or passage and connected respectively to the poles of the battery and having inclined contact faces, a plunger arranged to enter said passage and carrying a pair of spring plate contact members arranged to make contact with said terminals and having circuit wires connected thereto, and a spring-pressed reciprocator arranged to be engaged by said plunger when inserted in said passage and to automatically retract said plunger when pressure thereon is released.

In testimony whereof, I have hereunto set my hand.

EZEKIEL BOYD BIRCH.

Witness:
   G. G. TRILL.